No. 768,684. Patented August 30, 1904.

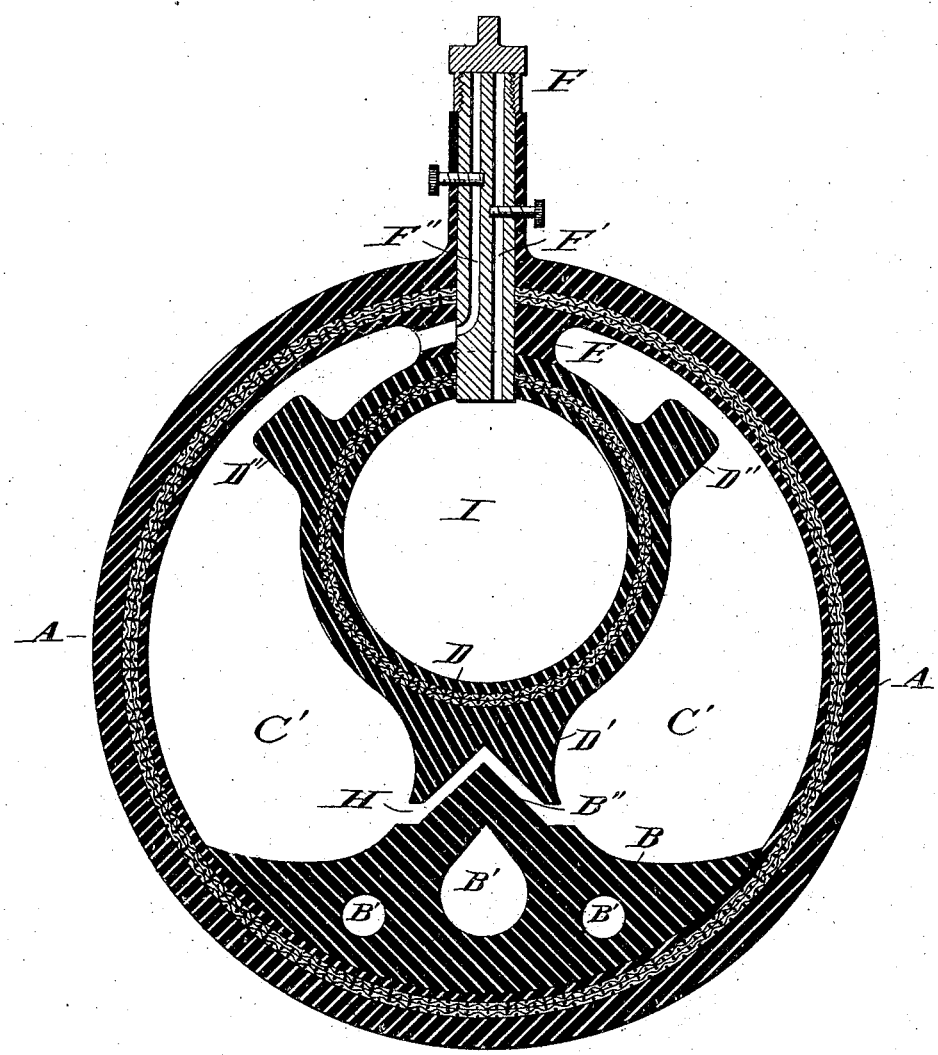

UNITED STATES PATENT OFFICE.

JOHN PARMLEY, OF PATERSON, NEW JERSEY.

PNEUMATIC TIRE.

SPECIFICATION forming part of Letters Patent No. 768,684, dated August 30, 1904.

Application filed February 10, 1904. Serial No. 193,030. (No model.)

*To all whom it may concern:*

Be it known that I, JOHN PARMLEY, a citizen of the United States of America, residing at Paterson, in the county of Passaic and State of New Jersey, have invented certain new and useful Improvements in Pneumatic Tires, of which the following is a specification, reference being had therein to the accompanying drawings.

The object of my invention is primarily to construct a practically punctureless and non-collapsible pneumatic tire.

Another object of the invention is to avoid as far as possible in the construction of a pneumatic tire the objectionable features of a solid tire by producing a tire comprising an outer pneumatic tube and an inner pneumatic tube which is practically surrounded by or suspended in the air in the outer tube, both tubes being supplied with air from a common valve, but through separate and independent air-channels.

A further object of the invention is to construct a tire with two concentric or practically concentric pneumatic tubes, which are spaced apart so that the air in the outer tube will form an air-cushion about the inner tube, and a still further object of my invention is to construct a pneumatic tire with a longitudinally-extending and centrally-located pneumatic brace or partition and with a longitudinally-extending perforated internal segmental tread-section.

The invention consists of the novel construction, combinations, and arrangements of parts herein described, and pointed out in the appended claims.

In the accompanying drawings, which form a part of this specification, is shown a transverse section through the improved tire and air-supply valve, the construction of the outer and inner pneumatic tubes, the independent air-channels leading from the valve to said tubes, and a means for opening or closing either of said channels.

My improved tire may be secured to the rim of any wheel in any of the various well-known ways now in vogue without departing from the scope and spirit of the invention.

All rims are provided with the usual spokes, and my tire may be secured to the rim by means of cement, lugs, and nuts, or as required by the nature of the rim used.

The wheel rim and spokes are not shown in the drawings, as it is not deemed necessary for the purposes of this application. The tire is usually circular in cross-section and continuous, and may be provided with a neck portion adapted to surround the valve-casing for the purpose of wiring. This neck would project through an opening in the rim; but its use is optional, as it in no way affects the essential character of the invention, being merely incidental thereto. The tire is also of circular form in the direction of its length.

A is the outer tube and is provided with an internal segmental tread-section B, which is either integral therewith or attached thereto in any suitable manner. The tread-section B is provided with openings, passages, or perforations B', which extend lengthwise thereof and is constructed of rubber or like elastic material. It is also formed with a projecting ridge portion B'', adapted to extend into and conform to the shape of the recess in the rib D' of the inner tube D. The inner tube D is also provided with the ribs or shoulders D'', which extend lengthwise around the same. The inner and outer tubes are connected by the portion E in any suitable manner.

When both tubes are inflated, there is a space between D' and B'', forming an air-passage, and if the outer tube is not inflated, or if inflated and it collapses a bit, the part D' will engage and rest upon B'' if there is pressure enough exerted.

The thickness of the tread-section B affords ample protection against the puncturing of the outer tube, and it is quite obvious that the inner tube is not apt to get punctured and would rest upon the portion B'' if for any reason the outer tube should lose some air and ample facilities would still be afforded for running purposes. The inner tube would still be inflated and its recessed rib D' would be in contact with the internal annular projecting ridge B'' of the tread portion B, constituting a support in direct line of gravity, and the wheel would not be put out of business. This construction practically constitutes a pneumatic partition in the outer tube A, which affords resiliency and easy running, adding to the comfort of the occupants of the vehicle. This improvement is in the line of progress which is from solid to pneumatic tires.

Both tubes are strengthened by layers of canvas and rubber and cement to any desired extent. The inner tube is practically surrounded by or suspended in the air in the outer tube. The valve F may be employed for separately or simultaneously inflating the outer and inner tubes with the necessary quantities of air, being connected with the said tubes by the air-channels F'' and F', respectively.

With this description of my invention, what I claim as new, and desire to secure by Letters Patent, is—

1. A pneumatic tire, comprising an outer tube having a longitudinally-extending internal perforated segmental tread-section, and an inner tube having a downwardly-extending rib directly above said tread-section, said tubes being spaced apart to form between the inner and outer tubes two communicating air-chambers, a supply-valve common to both tubes, channels connecting said valve and tubes and means whereby the latter may be independently inflated, substantially as set forth.

2. A pneumatic tire, having an outer tube provided with a longitudinally-extending internal perforated segmental tread-section, and an independently-inflatable pneumatic partition, having a rib depending above said tread-section, dividing the interior of the outer tube into two communicating air-chambers, which communication will be automatically closed when air escapes from either of the communicating chambers, by the coming together of the depending rib and tread-section substantially as set forth.

3. A pneumatic tire provided with an internal, elastic, segmental tread-section having air-chambers extending lengthwise thereof, and an independently-inflatable pneumatic partition extending to within a short distance of said tread-section and dividing the interior of the tire into two communicating air-receiving chambers, substantially as set forth.

4. In a pneumatic tire, the combination with an outer tube having an internal, segmental, elastic tread-section provided with air-chambers extending lengthwise thereof, of an inner pneumatic tube dividing the interior of the outer tube into two communicating air-chambers which practically surround the inner tube, and a valve for supplying air to the outer and inner tubes, each tube having a channel in communication with said valve, substantially as set forth.

5. In a pneumatic tire, an outer tube reinforced by inner layers of suitable material and provided with an internal, segmental tread-section of elastic material having air-chambers running lengthwise therein, in combination with an inner pneumatic tube, similarly reinforced, adapted to be connected at a portion of its circumference with the inner wall of the outer tube, and having a rib around the same extending to within a short distance of the tread-section in the outer tube, substantially as set forth.

6. In a pneumatic tire, an outer tube reinforced by inner layers of suitable material and provided with an internal segmental tread-section of elastic material having air-chambers running lengthwise therein, in combination with an inner pneumatic tube, similarly reinforced, adapted to be connected at a portion of its circumference with the inner wall of the outer tube, and having a rib around the same extending to within a short distance of said tread-section in the outer tube, and a valve for supplying air to the outer and inner tubes simultaneously or separately, each tube having a channel communicating with said valve and each channel being provided with means for opening or closing the same.

7. In a pneumatic tire, the combination with the outer tube having the segmental, elastic tread portion and the projecting valve-covering neck portion, of the inner tube spaced therefrom and provided with shoulders or ribs, one of which extends to within a short distance of the tread-section leaving a communicating passage between the air-chambers in the outer tube formed by the inner tube, a valve common to both tubes for supplying the necessary air, a channel connecting each tube with said valve, and being provided with means for opening or closing said channel, substantially as set forth.

8. A pneumatic tire, comprising a tube having an internal perforated segmental tread-section and a centrally-depending independently-inflatable pneumatic partition dividing the interior of said tube into communicating air-chambers, and adapted to engage or unite with said tread-section, upon the escape of air from either of said communicating chambers, to shut off said communication and to form a central support for said tire.

In testimony whereof I affix my signature in presence of two witnesses.

JOHN PARMLEY.

Witnesses:
JOHN F. KERR,
JOHN F. WEBSTER.